United States Patent [19]

Sitaramiah et al.

[11] Patent Number: 5,409,977
[45] Date of Patent: Apr. 25, 1995

[54] REPOSITIONAL GLUE STICK

[75] Inventors: George G. Sitaramiah, Ramsey; Jens L. Jorgensen, Woodbury, both of Minn.

[73] Assignee: Minnesota Mining and Manufacturing Company, St. Paul, Minn.

[21] Appl. No.: 136,496

[22] Filed: Oct. 14, 1993

Related U.S. Application Data

[63] Continuation of Ser. No. 2,699, Jan. 11, 1993, abandoned, which is a continuation of Ser. No. 743,131, Aug. 9, 1991, abandoned.

[51] Int. Cl.⁶ .................................................. C08K 5/17
[52] U.S. Cl. .................................... 524/247; 427/207.1; 427/208.4; 427/288; 524/394; 524/801
[58] Field of Search ................ 524/394, 247, 270, 801; 427/208.4, 288, 207.1; 428/317.7, 315.5, 355, 352, 407, 402.24

[56] References Cited

U.S. PATENT DOCUMENTS

| | | | |
|---|---|---|---|
| 3,576,776 | 4/1971 | Muszik et al. | 524/238 |
| 3,691,140 | 9/1972 | Silver | 524/240 |
| 3,817,887 | 6/1974 | Mestetsky | 524/394 |
| 3,857,731 | 12/1974 | Merrill et al. | 428/319.7 |
| 4,111,874 | 9/1978 | Meadus et al. | 524/394 |
| 4,158,648 | 6/1979 | Meadus et al. | 524/394 |
| 4,644,026 | 2/1987 | Shuman et al. | 260/825 |
| 4,657,960 | 4/1987 | Shuman et al. | 260/925 |
| 4,684,685 | 8/1987 | Shuman et al. | 260/825 |
| 4,716,189 | 12/1987 | Gollub et al. | 524/284 |
| 4,755,550 | 7/1988 | Shuman et al. | 260/825 |
| 4,968,562 | 11/1990 | Delgado | 524/801 |
| 4,994,322 | 2/1991 | Delgado et al. | 428/343 |
| 5,045,569 | 9/1991 | Delgado | 524/801 |

FOREIGN PATENT DOCUMENTS

| | | |
|---|---|---|
| 0326753 | 8/1989 | European Pat. Off. |
| 49-99550 | 9/1974 | Japan |
| 2-74279 | 3/1989 | Japan |
| 2-206672 | 8/1990 | Japan |
| 56-84749 | 7/1991 | Japan |
| 2234256 | 1/1991 | United Kingdom |

*Primary Examiner*—Veronica P. Hoke
*Attorney, Agent, or Firm*—Gary L. Griswold; Walter N. Kirn; Carolyn V. Peters

[57] ABSTRACT

A repositionable glue stick comprising:
a) at least 10 percent by weight of an infusible, non-polar organic liquid dispersible, non-polar organic liquid insoluble, inherently tacky, elastomeric copolymer microsphere, and
b) a gelling component in an amount sufficient to provide a Penetration Value of less than 40 mm is disclosed.

18 Claims, 1 Drawing Sheet

REPOSITIONAL GLUE STICK

This is a continuation of application Ser. No. 08/002,699, filed Jan. 11, 1993, now abandoned, which is a continuation of Ser. No. 07/743,131, filed on Aug. 9, 1991, now abandoned.

FIELD OF THE INVENTION

This invention relates to adhesives applied from a solid form. More specifically this invention relates to a solid form repositionable adhesive.

BACKGROUND OF THE INVENTION

U.S. Pat. No. 4,657,960 (also, U.S. Pat. Nos. 4,644,026, 4,684,685 and 4,755,550) describe a gelled solid adhesive for coating a substrate such as paper or cardboard. The preferred gelled adhesive product is formed of an aqueous dispersion of components which include a natural rubber latex component, a friction reducing agent, a tackifier, an antioxidant and a gelling agent. The adhesive is available in stick form. The adhesive has sufficient tack to enable the coated substrate to instantly adhere to paper surfaces while permitting readherence of the adhesive coated substrate to the same or different free contact surfaces. An adhesive coated paper substrate will readhere many times to free paper contact surfaces.

EPO application number 326753 describes a solid adhesive which maintains adhesion properties with consecutive cyclic usage of adhesion-removal-readhesion applications. The adhesive comprises adhesive substances which are soluble or dispersible in a liquid medium, alkali metal salts or ammonium salts of aliphatic carboxylic acids and at least one polystyrene resin and a resin such as polyisobutylene resin and/or polybutene resin.

U.S. Pat. No. 4,716,189 describes a stick for the application of adhesive material to a substrate. The adhesive composition comprises an acrylic ester adhesive dissolved or dispersed in a liquid medium containing an alkali metal or ammonium salt of an aliphatic carboxylic acid and an aqueous dispersion of polyethylene. The stick enables articles to be removed from a substrate without leaving a film of adhesive on the substrate after removal.

UK Patent Application number 2 234 256 A discloses a solid adhesive composition useful for temporary and repeated fixation of an article on a surface comprising an acrylic resin, a polyacrylic acid-based thickening agent, a fatty acid soap, an alkali hydroxide, microspheres and water. The microspheres useful in this composition are various inorganic or organic microspheres made of silica, borosilicate glass and the like, and organic microspheres made of an acrylic resin, a silicone resin and the like. These microspheres are non-tacky, and primarily function to reduce the contact area of adhesive coating. Preferably, the microspheres have an average particle size of 10–200 micro meters.

SUMMARY OF THE INVENTION

This invention relates to a repositionable glue stick comprising at least 10 percent by weight of an infusible, non-polar organic liquid dispersible, non-polar organic liquid insoluble, inherently tacky, elastomeric copolymer microsphere, and a gelling component in an amount sufficient to provide a Penetration Value of less than 40 mm.

Penetration Value is determined by ASTM Test Method D-5, Penetration of Bituminous Materials. This test method covers the determination of the penetration of semi-solid and solid bituminous materials. The hardness of the stick is equated to the penetration of a standard needle expressed as the distance to the nearest tenth of a millimeter that the needle vertically penetrates a sample of the material under known conditions of loading (50 grams$\pm$0.05), time (10 sec$\pm$0.1 sec) and temperature (22° C.$\pm$1°).

DETAILED DESCRIPTION OF THE PRESENTLY PREFERRED EMBODIMENTS

Figure 1:
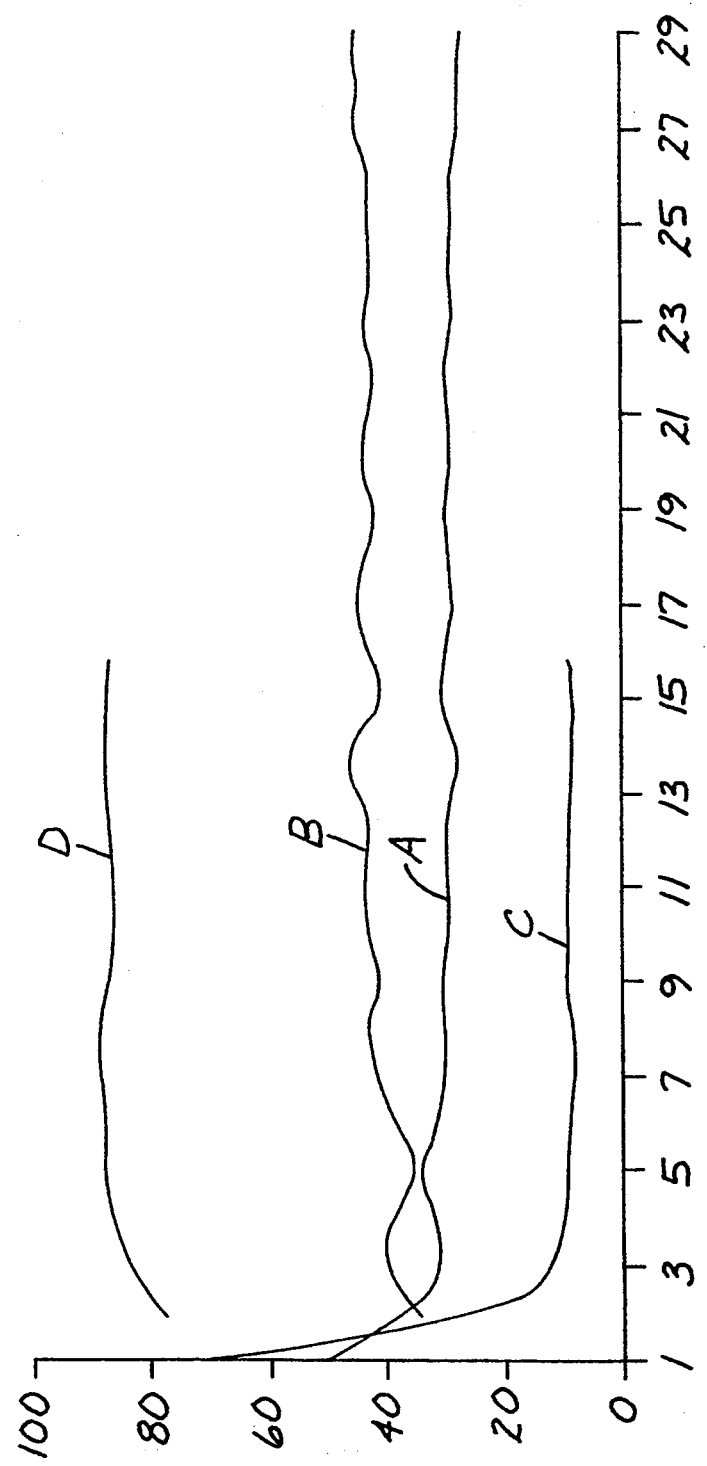
FIG. 1 is a graph showing peel adhesion force of repeated application and removal of the same adhesive-coated sample, and the percentage of peel adhesion loss experienced by the sample.

Glue sticks have found wide use to apply thin films of adhesive to a substrate. The user simply coats one side of the substrate to be mounted to another surface. The substrate may be a memo, newspaper clipping, notice, photographs or the like. Although the adhesive may be coated onto a variety of substrate materials, the adhesive is preferably applied to paper substrates. This adhesive-coated substrate will readily adhere to almost any surface such as wood, paper, plastics and wall surfaces.

Repositionable adhesives when applied to a substrate should permit adherence of the coated substrate to a contact surface, permit removal of the coated substrate and allow readherence of the coated substrate to another contact surface.

This invention relates to a repositionable glue stick comprising at least 10 percent by weight of an infusible, non-polar organic liquid dispersible, non-polar organic liquid insoluble, inherently tacky, elastomeric copolymer microsphere, and a gelling component in an amount sufficient to provide a Penetration Value of less than 40 mm.

This repositionable adhesive stick has sufficient integrity to be provided in stick form, yet smoothly dispense onto a substrate when it is gently glided over the substrate. The adhesive adheres to the substrate without prior priming or coating of the substrate, yet does not adhere so strongly to the contact surface that the paper fibers are torn from the contact surface on removal. The adhesive coated substrate is readily removable without leaving undue adhesive residue and does not remove noticeable paper fibers from the contact surface. Additionally, the adhesive should not transfer to the contact surface, and should not discolor or substantially increase adhesion with age. Ideally, a piece of paper coated with the repositionable glue stick adhesive of the present invention will have a peel adhesion from a paper substrate no more than 10% higher three months after application than a piece removed from a paper substrate the day after application. This is in contrast with the experience of conventional natural rubber-based adhesives, which tend to yellow upon ageing and also tend to form permanent bonds due to the "coldflow" characteristics of film-forming adhesives. In some instances, conventional adhesives may also require an intermediate primer layer between the substrate and the binder or adhesive layer to provide proper wet-out on a substrate. Such a primer is not generally needed in the glue stick adhesive of the present invention.

Preferably, the repositionable glue stick adhesive of the present invention comprises infusible, solvent-dispersible, solvent-insoluble, inherently tacky, elastomeric copolymer microspheres; a gelling agent; a binder; surfactant; humectant; base; antimicrobial agent; and water.

The polymeric microsphere adhesive used in accordance with this invention is infusible, solvent-dispersible, solvent-insoluble, inherently tacky, elastomeric copolymer microspheres which consist of about 90 percent to about 99.5 percent by weight of a least one alkyl acrylate ester and about 10 to about 0.5 percent by weight of at least one monomer selected from the group consisting of substantially oil-insoluble, water-soluble ionic monomers and maleic anhydride. The copolymer microspheres are small in size, having diameters in the range of about 1 to about 250 microns. The diameter of the majority of the microspheres fall in the range of about 5 to about 150 microns. Preferably, the microspheres have a diameter in the range of between 25 and 50 microns. Polymeric microsphere adhesives are disclosed, for example in U.S. Pat. No. 3,691,140. Although the above microspheres are most preferred, one can also use hollow microsphere adhesives that are repositionable pressure-sensitive adhesives comprising from about 70 percent to about 99 percent hollow, polymeric, acrylate, inherently tacky, infusible, solvent-insoluble, solvent-dispersible, elastomeric microspheres comprising at least one alkyl acrylate or alkyl methacrylate ester, a majority of the microspheres having one or more interior voids having a diameter of at least about 10 percent of the diameter of the microsphere, and correspondingly, from about 30 percent to about 1 percent of a binder copolymer comprising an elastomeric polymeric backbone having pendant high Tg polymeric moieties. These hollow microspheres are normally tacky, elastomeric, insoluble but swellable in organic solvents. The microspheres typically have diameters of at least 1 micron, and preferably diameters in the range of about 1 to about 250 microns. The voids typically range in size up to about 100 microns or larger. Hollow polymeric microsphere adhesives are disclosed, for example in U.S. Pat. No. 4,994,322.

The use of the inherently tacky microspheres permits the repositionability of the coated substrate. The tacky microspheres provide a pressure-sensitive adhesive which has a low degree of adhesion that permits separation, repositioning and re-bonding of adhered objects. These tacky spheres resist permanent deformation, regaining their spherical shape upon release of pressure. They also exhibit a very low film or tensile strength, less than about 10 psi.

A gelling agent is provided to cause the coagulation of all of the solids in the formulation, resulting in a solid or semi-solid gelled adhesive product. Many suitable gelling agents are available for this product and may be selected from the preferred class of salts of an aliphatic carboxylic acid wherein the cation consists of an alkali metal. A full discussion of these gelling agents may be found in U.S. Pat. No. 3,576,776. In this glue stick formulation, sodium stearate has been found to provide an adhesive that gels quickly upon cooling, permitting the formation of the desired glue stick or any such easily dispensable shape. Sodium stearate may be provided in the salt form, or may be formed in situ as the neutralization product of stoichiometric amounts of sodium hydroxide and stearic acid. As noted above, sufficient gelling agent is provided to achieve a Penetration Value of less than 40. Penetration Values of from about 6 to about 25 mm are preferred, with a more preferred range of from about 12 to about 18 mm. When the penetration values exceed about 25 mm, the stick is considered soft. The amount of the adhesive laid down on to the substrate will be in excess of that needed for adhesion. Although the adhesion will be satisfactory, there will be excessive adhesion transfer when the substrate is removed. The film of adhesive on the substrate will be non-uniform and have a streaky appearance. When the penetration value is less than 10 mm the stick is considered hard. A hard stick will lay a lesser amount of adhesive on to the paper substrate with lower adhesion values. When the hardness of the stick is excessive, combined with a low lubricity or high drag force, the deposit of the adhesive will resemble that of the residue an eraser leaves when used to erase a pencil image from paper. Ideally, the hardness of the stick is adjusted to provide a single layer of microspheres on the paper substrate by about three strokes of the stick on the paper. When the repositionable glue stick adhesive is applied in heavier coating weights, it appears that the top layer of microspheres lack good anchorage to the substrate and are more readily transferred to the receiving surface. The binder component is a polymer or blend of polymers that provides anchorage for the inherently tacky polymeric microspheres. The binder component thus reduces adhesive transfer to the receiving surface. The binder component may be selected from hard or soft resins and should be compatible with the microspheres, i.e., it should neither chemically attack the copolymer microspheres nor act as a solvent for them. In other words, the anchoring binder should be inert toward the microspheres. Film-forming resins having a high degree of adhesion for the acrylate copolymer microspheres generally are effective to anchor the microspheres to a substrate. Relatively hard resins, such as epoxies and nitrocellulose, and relatively soft resins, such as acrylates and vinyl ethers, are examples of suitable film-forming anchoring binder resins. Acrylic adhesives are preferred for the binder component because they tend to age better than natural rubber, block elastomers and the like. Adhesives produced from unsaturated elastomers such as natural rubber, SBR and block copolymers (S-I-S and S-B-S) undergo oxidation and ultraviolet degradation. Acrylic adhesives will remain pliable and pressure sensitive for an indefinite period of time. The natural rubber adhesives on the other hand require additional anti-oxidant and ultraviolet stabilizers to extend shelf-life but they themselves deteriorate with time. In excess of two years can be expected when a suitable air-tight container is selected to contain the stick. Additionally, because of the inherent aging stability, this solid acrylic adhesive stick will remain pliable and pressure sensitive for an indefinite period of time.

The preferred binder component is taught in U.S. Pat. No. 3,857,731, Example 2. In the preferred embodiment, RHOPLEX N-580, an n-butyl acrylate latex emulsion available from Rhom & Haas, is combined with an additional binder component, polyvinyl pyrrolidone (PVP). Binder materials, especially carboxymethyl cellulose and polyvinylpyrrolidone (PVP), have been found to increase the viscosity of the gelled stick adhesive and therefore act as a processing aid. The binder may also act to reduce the drag force of the adhesive stick on paper, thereby contributing to the overall coatability of the glue stick adhesive.

The surface active agent serves to improve compatibility of the inherently tacky microsphere adhesive and the acrylate emulsion binder. Surfactants may be selected from the classes of non-ionic and/or anionic surface active agents. The non-ionic surfactants of choice are prepared by the reaction of octylphenol or nonylphenol with ethylene oxide. The resulting products are of the class alkyl aryl polyether alcohols. A preferred surfactant of this class is the reaction product of octylphenol with ethylene oxide, which results in an alkyl aryl polyether chemically described as an octylphenoxypolyethoxy ethanol. This alkyl aryl polyether class of surfactants is available commercially as TRITON surfactants from Rohm and Haas Company, Philadelphia, Pa. The preferred non-ionic surfactant is an octylphenoxypolyethoxy ethanol containing an average of nine to ten ethylene oxide units per molecule, commercially available as TRITON X-100 surfactant and has an HLB number of 13.5. The anionic surface active agents may be a synthetic sulfonate (otherwise known as petroleum sulfonate) having an average equivalent weight within the range of 375 to 500. These sulfonates are well known in the art and are sometimes referred to as alkyl aryl sulfonates. They may be a complex mixture of components including aryl sulfonates and alkaryl sulfonates with the mixture consisting mostly of monosulfonates having one $-SO_3Na$ (or $-K$ or $-NH_4$) group per molecule. These individual hydrocarbon sulfonates, for example, can include the following compounds: The ammonium, sodium or potassium dodecylbenzene sulfonates ($C_{18}H_{29}SO_3M$); alkanesulfonates such as octadecane sulfonate ($C_{18}H_{29}SO_3M$); and phenylalkane sulfonates such as phenyldodecane sulfonate ($C_{18}H_{29}SO_3M$). As used herein, the term "equivalent weight" is used in the usual manner. In the case of pure monosulfonates, the equivalent weight equals the molecular weight whereas the equivalent weight of disulfonates is equal to one-half the molecular weight. While synthetic (or petroleum) sulfonates are preferred, other suitable surfactants include sulfates of polyoxyalkylated alcohols such as the NEODOL TM's (Shell Chemical Company) and TERGITOL TM (Union Carbide Corp.) ethoxylated phenols, aminocarboxylates such as sodium N-lauroylsarcosinate, alkyl sulfates such as sodium lauryl sulfate and phosphate esters such as di(2-ethylhexyl)phosphate. The surfactant is used in an amount within the range of from about 0.1 to about 5.0 weight percent surfactant based on the weight of water. Surfactants may alternatively be selected to provide an water-in-oil emulsion. Glue sticks having this type of emulsion readily provide a product that does not wrinkle paper on application because the water in the stick is located in the inner phase of the emulsion and does not immediately affect the paper.

Other materials may be provided in the glue stick adhesive to aid in the dispersion of the materials, as well as perform other functions. For example, polyethylene glycol (PEG) may be provided both as a dispersant and as a humectant. The level of PEG is determined by the degree to which the microspheres and the binder adhesive disperse uniformly throughout the mixture. If too high a level of PEG is present, the glue stick will demonstrate a high level of adhesive transfer as well as an increase in the adhesion build over time. PEG also acts as a humectant to assist in maintaining the water content of the adhesive stick. The preferred polyethylene glycol is CARBOWAX TM 200 polyethylene glycol available from the Union Carbide Co., New York, N.Y. Other PEG materials may be used such as GAFANOL polyethylene glycol available from GAF Corporation of New York, N.Y. Other molecular weight materials may be used as determined by solubility and compatibility with the other ingredients of the glue stick.

Stick hardness may be increased by adding a base material. Conventional bases or alkaline materials may be used such as ammonium hydroxide, sodium hydroxide, monoethanol amine and the like. The strong odors usually associated with ammonium hydroxide and monoethanol amine make them undesirable in a glue stick. Also, yellowing of the glue stick can be attributed to ammonia and amine type basic materials. However, 2-amino 2-methyl 1-propanol is the preferred basic ingredient because of its low odor and stability towards non-yellowing with age.

Anti-foaming agents may be added to prevent foaming during mixing and subsequent air entrapment in the gelled stick. Silicone latex emulsions tend to reduce this foaming action while also reducing adhesive transfer from the substrate to the contact surface. Silicone emulsions of the dimethylsiloxane family have been found to effectively reduce foaming and air entrapment in the gelled stick. The preferred silicone emulsion is Dow 24 Silicone emulsion available from the Dow Chemical Co., of Midland, Mich.

Anti-microbial agents, which prevent microbial growth in the aqueous systems may be needed. Antifungal agents such as METASOL TK TM (2-(4-thiazoyl) benzimidazole, available from the Calgon Corporation, Pittsburgh, Pa.) and PREVENTOL CMK TM (the sodium salt of parachloro meta cresol which is a broad spectrum anti-microbial agent available from the Mobay Corporation of Pittsburgh, Pa.) may be utilized for this purpose.

Preferably, the solid adhesive of the present invention will have a shelf life in excess of two years when stored under normal room temperature conditions. The shelf life of a material is the period of time during which a material may be stored and remain suitable for use. The glue stick should of course maintain the adhesive properties of repositionability and removeability throughout the life of the stick. The stick should continue to be easily and uniformly dispersed by gentle rubbing the exposed end of the stick onto a paper substrate. A thin, colorless and uniform coating, with a non-objectionable odor should be maintained throughout the useful life of the stick.

Preferred glue sticks of the present invention comprise:

| COMPONENT | Range wt % By Weight |
| --- | --- |
| Water | 0–40 |
| Anti-microbial agent | 0–1 |
| Surface active agent | 0–5.0 |
| Dispersant/Humectant | 0–10 |
| Organic base | 0–2.5 |
| Microsphere adhesive (69% solids) | 10–60 |
| Binder component | 0–26 |
| Anti-foaming agent | 0–4 |
| Gelling agent | 6–15 |

Optionally, a colored glue stick may be produced by the addition of a coloring component. Examples of suitable coloring components include pH indicators, dyes, tints, fillers that impart color to the composition, and the like. By selecting an appropriate pH indicator, a stick may be produced which is colored while in the container, and also after application of the adhesive to the paper. However, as the water evaporates from the adhesive film, the pH will decrease, causing the indicator to go through a color change. Ideally, the pH indicator should be colored at the high pH side and colorless on the low pH side. This allows the user to see where the adhesive has been initially applied. After the adhesive has dried, the adhesive will be colorless and will not affect the final appearance of the glued paper. Suitable pH indicators may be selected, for example, from the phthalein class of indicators such as thymolphthalein, phenolphthalein or ortho cresolphthalein. However, nearly any indicator which undergoes a color change in the pH range of from about 8 to about 11 may be used.

TEST METHODS

Adhesive Coating Weight

A 1.25 cm by 20 cm piece of pre-weighed (W1) paper is laid flat on a second sheet of paper. 5 cm of the 1.25 cm wide strip of paper is covered using a third sheet of paper. This provides the tester an area to hold the strip down while exposing 20 cm² of the paper strip. The paper strip is then coated with 3 strokes of adhesive from the adhesive stick. The adhesive is applied using a stroking method, where the stroke begins on the third sheet of paper and is ended on the second sheet of paper. After completing the third stroke, the paper strip is weighed to the nearest 0.0001 gram (W2). The coating weight is calculated by subtracting W1 from W2, and is expressed in g/20 cm². Time elapsed before testing is 30 seconds.

Peel Adhesion

Peel adhesion is the force required to remove a coated flexible sheet material from a test panel measured at a specific angle and rate of removal. In the examples, this force is expressed in grams per 1.25 cm of width.

An adhesive coated strip is prepared using the same method as used to determine coating weight. It is customary to specify a drying time for the adhesive coated sample. This drying time is the time between the application of the last stroke of adhesive and when the adhesive coated sample is applied to the test surface.

After the specified drying time, the 1.25 cm wide adhesive coated sample is brought into contact with the desired test surface. A 2 Kg hard rubber roller is used to apply the strip at a rate of 30.5 cm/sec. The free end of the coated strip is doubled back nearly touching itself so the angle of removal will be 180 degrees. The free end of the strip is attached to the load cell of an IMASS Slip Peel tester, and then removed at a rate of 30.5 cm/sec. The average removal force is recorded and reported in grams per 1.25 cm width. For the reported test results, the test strip was coated with 3 strokes and allowed to dry for 30 seconds. The paper used is type 696 Copy Bond available from the 3M Company, St. Paul, Minn.

To determine how well an adhesive performs under cyclic usage of adhesion-removal-readhesion applications, a sample is prepared as outlined in the peel adhesion test method. The paper substrate and free contact surface used is 696 type white bond, sub 20 copier paper available from the 3M Company. The adhesive coated sample is applied and removed in accordance with the peel adhesion test method. The same sample is then cyclically applied and removed for a total of thirty repetitions, with the removal force recorded during each removal step.

EXAMPLES

The following examples are illustrative in nature, and are not intended to limit the scope of the present invention in any way.

Example 1

| (Oil-in-water Emulsion) | |
|---|---|
| COMPONENT | % By Weight |
| Deionized Water | 20.9 |
| METASOL TK ™ [1] | 0.1 |
| PREVENTOL CMK ™ [2] | 0.1 |
| TRITON ™ X-100 [3] | 2.0 |
| Polyethylene Glycol, MW 200 | 5.0 |
| 2-amino-2-methyl-1-propanol | 1.4 |
| Microsphere adhesive (69% solids) [4] | 49.0 |
| RHOPLEX ™ N-580 Emulsion [5] | 10.0 |
| Dow 24 Silicone Emulsion [6] | 1.0 |
| Polyvinyl pyrrolidone - K-90 [7] | 1.5 |
| Sodium stearate | 9.0 |

[1] METASOL TK ™ antifungal agent, 2-(4-thiazoyl)benzimidazole available from the Calgon Corp., Pittsburgh, PA.
[2] PREVENTOL CMK ™, sodium salt of parachloro metacresol, Mobay Corp., Pittsburgh, PA.
[3] TRITON ™ X-100 is a non-ionic octylphenol surfactant available from Rohm & Haas of Philadelphia, PA.
[4] The microsphere adhesive is an inherently tacky microsphere latex emulsion which contain about 90 to 99.5 weight percent acrylate monomer and about 10 to about 0.05 weight percent ionic monomer, maleic anhydride, a mixture thereof as disclosed in U.S. Pat. No. 3,691,140, Example 1.
[5] RHOPLEX ™ N-580 Emulsion is an n-butyl acrylate latex PSA emulsion available from Rohm & Haas.
[6] Dow 24 Silicone Emulsion is a poly dimethylsiloxane latex emulsion available for the Dow Chemical Company, Midland, MI.
[7] The polyvinyl pyrrolidone K-90 is a water soluble polymer available from GAF Corp. New York, NY.

The first nine ingredients are added in order with thorough mixing between each addition. The polyvinylpyrrolidone and the sodium stearate are premixed as dry powders and slowly added to the cool mixture to prevent clumping of the powders. The mixture is then heated to 80 degrees Celsius and the mixing continued for twenty minutes. At 80 degrees C. the viscosity will be about 280 cps at 16.8 sec$^{-1}$ shear rate(60 rpm, LVT viscometer, SC4-34 spindle).

The glue stick of this instant invention may be dispensed from a lipstick type tube dispenser. The exposed surface of the gelled adhesive is gently rubbed on a surface of the paper substrate to be subsequently attached to another surface. The thin uniform film (of from about 0.0005 g/cm² to about 0.0030 g/cm²) is essentially transparent and does not wrinkle the paper substrate surface. After about 30 seconds the coated surface may be readily attached to surfaces such as paper, cardboard, walls and the like and be repeatedly removed and readhered to like surfaces at least 30 additional times. Also, the thus repositionable coated paper may be attached to such surfaces and allowed to remain for an indefinite period of time. Even after extended periods of time, the adhesive will not permanently adhere to the surface and will remain tacky; will not leave a residue of adhesive on the surface, will be readily adhereable to other like surfaces and will not discolor the adhesive film or either of the primary or secondary surfaces.

Example 2

(Water-in-oil Emulsion)

Glue sticks may also be prepared using a water-in-oil emulsion to which the adhesive microspheres and acrylate adhesive is added. The advantage of this formulation is to reduce the effect of the water in the stick to wrinkling of certain paper substrates. Papers with low water wet strength will cockle or wrinkle when water-based adhesives having a high water content are applied to them. This example demonstrates an approach to overcome this disadvantage.

| Ingredient | Wt. Percent |
| --- | --- |
| Odorless mineral spirits | 8.20 |
| Aristowax TM, paraffin wax[4] | 1.40 |
| Arlacel C TM, surfactant[1] | 2.20 |
| Sodium stearate | 6.90 |
| Stearic acid | 0.70 |
| Water | 8.20 |
| Flexcryl TM 1625 (69%)[2] | 28.00 |
| Microsphere adhesive (70%) | 41.00 |
| Methocel TM J-75MS[3] | 3.1 |
| Ammonium hydroxide | 0.70 |

[1]Arlacel C is a sorbitan sesquioleate surfactant available from ICI Americas Inc., Wilmington, DE.
[2]Flexcryl 1625 is a pressure sensitive adhesive emulsion available from Rohm and Haas, Philadelphia, PA.
[3]Methocel J-75MS is a thixotrope, a hydroxy propyl methyl cellulose available from Dow Corning, Midland, MI.
[4]Aristowax is a paraffin wax available from Union Oil of California.

The first six ingredients are heated to about 80° C. and mixed until uniform and smooth. The next ingredients are added in order while mixing slowly until the material becomes smooth. The hot mixture is then poured into molds and allowed to cool. When the stick is rubbed over paper no noticeable wrinkling is observed.

Examples Demonstrating the Use of Different Bases

| COMPONENT | EXAMPLE 3 Weight in g. | EXAMPLE 4 Weight in g. |
| --- | --- | --- |
| Deionized Water | 17.2 | 17.2 |
| METASOL TK TM | 0.1 | 0.1 |
| PREVENTOL CMK TM | 0.1 | 0.1 |
| TRITON TM X-100 | 2.0 | 2.0 |
| Polyethylene Glycol 200 | 4.9 | 4.9 |
| 2-amino-2-methyl-1-propanol | 1.4 | |
| Monoethanol amine | | 2.0 |
| Thioset M | | 0.6 |
| Microsphere adhesive 69% solids | 48.9 | 48.9 |
| RHOPLEX TM N-580 Emulsion | 11.7 | 11.7 |
| Dow 24 Silicone Emulsion | 0.8 | 0.8 |
| Polyvinyl pyrrolidone - K-90 | 2.0 | 2.0 |
| Sodium stearate | 9.0 | 9.0 |

Examples 3 and 4 demonstrate the difference between using 2-amino-2-methyl-1-propanol and monoethanolamine/monoethanolamine sulfite (MEA/MEA sulfite) as the alkaline component(s) in the repositionable glue stick. Although physical properties such as penetration and pH of the two formulations are comparable, we have learned that a stick produced using formulations containing MEA/MEA sulfite will turn light amber after one year of aging at ambient conditions. In an effort to accelerate this aging effect, wafers of adhesive produced using Examples 3 and 4 were exposed to air at 49° C. for 48 hours. The wafers produced in example 2 did not change appreciably in color, while the wafers in Example 4 turned to a light yellow color. To further demonstrate this phenomenon, sticks produced using each formulation were held at 65° C. for three weeks in glue stick type containers. Again, the sticks produced in Example 3 did not change appreciably in color, while those produced in Example 4 turned to a moderately yellow color.

Additionally, when adhesive containing MEA/MEA sulfite is applied to paper, yellow staining has been observed predominately after long term aging. This yellow staining is most obvious when the adhesive is applied to newsprint. When the adhesive as shown in Example 4 is applied to newsprint, an intense yellow stain is observed. Also, the yellow staining observed from this example has been shown to migrate to layers of newsprint adjacent to the layer to which the adhesive has been applied. When the adhesive shown in Example 3 is applied to newsprint, however, only a faint yellow stain is observed, and no stain migration has been seen. Although sticks produced using the formulation shown in Example 4 have been shown to discolor with time, it should be noted that the overall physical properties will remain acceptable.

Examples Demonstrating Colored Stick

| COMPONENT | EXAMPLE 5 Weight in g. | EXAMPLE 6 Weight in g. |
| --- | --- | --- |
| Deionized Water | 21.1 | 21.1 |
| METASOL TK TM | 0.1 | 0.1 |
| PREVENTOL CMK TM | 0.1 | 0.1 |
| TRITON TM X-100 | 2.0 | 2.0 |
| Polyethylene Glycol 200 | 5.0 | 5.0 |
| 2-Amino 2-Methyl-1-Propanol | 1.4 | 1.4 |
| Microsphere adhesive 69% solids | 49.0 | 49.0 |
| RHOPLEX TM N-580 Emulsion | 10.0 | 10.0 |
| Dow 24 Silicone Emulsion | 1.0 | 1.0 |
| Polyvinyl pyrrolidone - K-90 | 1.5 | 1.5 |
| Sodium stearate | 9.0 | 9.0 |
| Ortho-cresolphthalein[1] | 0.4 | — |
| Phthalo Blue Pigment Dispersion[2] | — | 2.0 |

[1]Ortho-cresolphthalein is available from the Aldrich Chemical Co., Milwaukee, WI.
[2]Phthalo Blue Pigment Dispersion is available Daniel Products Company, Jersey City, NJ.

Examples Demonstrating Hardness

| | 7 | 8 | 9 | 10 | 11 |
| --- | --- | --- | --- | --- | --- |
| Sodium Stearate | 9.5 | 9 | 9.5 | 8.5 | 9.5 |
| Microsphere Adhesive | 51 | 49 | 51 | 47 | 48.3 |
| Triton X-100 | 1.5 | 2 | 1.5 | 2.5 | 2 |
| Rhoplex N-580 | 8 | 10 | 12 | 12 | 11.7 |
| 2-amino-2-methyl-propanol | 2 | 1.4 | 0.8 | 0.8 | — |
| PEG 200 | 6.5 | 5 | 3.5 | 3.5 | — |
| PVP K-80 | 0 | 1.5 | 3 | 3 | — |
| Dow 24 Emulsion | 0.5 | 1 | 0.5 | 1.5 | 0.8 |
| DI Water | 21 | 21.1 | 18.2 | 21.2 | 20 |
| % Solids | 58.9 | 58.2 | 59.8 | 57.4 | — |
| Penetration (mm) | 6.2 | 12.5 | 18.1 | 34.7 | 33.2 |

Examples 7–10 demonstrate the wide variety of penetration values obtainable by small variations in each of the raw material. It has been observed that by increasing the amount of AMP present in the formulation, the penetration values can be significantly reduced. Likewise, increasing the PEG content also decreased penetration value. Conversely, increasing PVP and Triton X-100 levels have been shown to make the finished sticks softer (higher penetration values). From a practical standpoint, sticks made using Example 7 also had low lubricity when applied to paper. This is due to the high internal strength of the glue stick, thereby preventing the stick from fracturing and applying a smooth film of adhesive to the paper. Rather, the application to paper was more like that of a pencil eraser, leaving only a small amount of adhesive similar in pattern to that left by an eraser. Sticks made using Example 10, however, were very soft and easily fracturable. The adhesive sticks glided easily over paper, but left an excessive amount of adhesive on the paper surface. Additionally, sticks made using this formulation had a tendency to deform if too much pressure was used when applying the adhesive. Sticks made using Examples 8 and 9 had a good balance of all of these properties. They were soft enough to easily fracture and apply a uniform layer of adhesive, yet were hard enough such that they did not deform during use.

Example 11 demonstrates a formulation containing only a gelling agent, the microsphere adhesive, a single binder, an anti-foaming agent, and water. Although sticks made during this formulation did function as intended, they were not as superior as sticks made using Example 8 and 9. Example 11 showed excessive softness and adhesive laydown, and the adhesive did not preferentially bond to the surface to which it was applied as tenaciously as do formulations containing the additional PVP binder.

FIG. 1 is a graph showing the peel adhesion force of repeated application and removal of the same adhesive coated sample. Line A represents the observed peel adhesion of the adhesive of Example 8, tested according to the protocol described above. Line C represents the observed peel adhesion of a sample of Tack a Note ™ adhesive stick, which is a natural rubber-based adhesive repositionable glue stick available from Dennison Manufacturing Co., Farmington, Mass. Ideally, there would be no adhesion loss seen from the first debonding through the last, however, due to the tackifying effect of any water which may be remaining in the adhesive layer after the thirty second drying time, some adhesion loss is noted as this excess water evaporates. Additional adhesion loss may also be due to the fact that the paper backing acquires a "set" during the 180 degree peel testing, thereby requiring less energy to bend the backing after this "set" is acquired during the first one or two removal phases. Line B represents the percent adhesion loss of the adhesive of Example 1. Line D represents the percent adhesion loss of the Tack a Note ™ adhesive stick product. Percent adhesion loss is calculated from the following equation:

$$\% \text{ adhesion loss} = \frac{(\text{Initial adhesion} - (n^{th} \text{ adhesion}))}{(\text{Initial adhesion})} \times 100$$

FIG. 1 demonstrates that the commercially available Tack a Note ™ adhesive stick, available from Dennison Manufacturing Co., Farmington, Mass., shows considerably more adhesion loss (86.6%) through the first four application-removal cycles than do sticks prepared using this invention (40.4%) when tested under identical conditions. The Tack a Note ™ stick begins with an adhesion of 68.7 g/1.27 cm but falls to only 9.2 g/1.27 cm after only four removals, such a low adhesion level that potentially the desired object may become inadvertently detached, especially if mounted on a vertical surface. Sticks made using this invention begin with an adhesion of 51.1 g/1.27 cm and maintain an adhesion of 30.5 g/1.27 cm through four application-removal cycles. This level of adhesion is quite adequate to hold most paper objects to the desired free surface, even when mounted on vertical surfaces.

We claim:

1. A repositionable glue stick comprising:
   a) at least 10 percent by weight of an infusible, non-polar organic liquid insoluble inherently tacky, elastomeric, acrylate or methacrylate copolymer microsphere,
   b) a binder component comprising a pressure sensitive adhesive polymer and present in an amount of up to about 26 percent by weight, and
   c) a gelling component in an amount sufficient to provide a Penetration Value of less than 40 mm.

2. The glue stick of claim 1, wherein said microspheres are solid.

3. The glue stick of claim 1, wherein said microspheres are hollow.

4. The glue stick of claim 1, wherein said binder component is an acrylate polymer.

5. The glue stick of claim 1, wherein said binder component is a blend of n-butyl acrylate and polyvinyl pyrrolidone.

6. The glue stick of claim 1, wherein said gelling component is an aliphatic carboxylate.

7. The glue stick of claim 6, wherein said gelling agent is sodium stearate.

8. The glue stick of claim 1, wherein said glue stick is a water-in-oil system.

9. The glue stick of claim 1, wherein said glue stick is an oil-in-water system.

10. The glue stick of claim 1, comprising the following components in weight percent:
    a) Water 0–40
    b) Anti-microbial agent 0–1
    c) Surface active agent 0–5.0
    d) Dispersant/Humectant 0–10
    e) Organic base 0–2.5
    f) Microsphere adhesive (69% solids) 10–60
    g) Binder component 0–26
    h) Anti-foaming agent 0–4
    i) Gelling agent 6–15

11. The glue stick of claim 1, wherein a 696 type white bond, sub 20 copier paper coated with at least a 0.0007 grams/cm$^2$ coating of said adhesive is repositionable on a 696 type white bond, sub 20 copier paper surface at least thirty times with a peel adhesion loss of no more than 50% through the first four adhesion-readhesion cycles.

12. The glue stick of claim 1, having a Penetration Value of between about 6 to about 25 mm.

13. The glue stick of claim 1, having a Penetration Value of between about 12 to about 18 mm.

14. The glue stick of claim 1, further comprising a base.

15. The glue stick of claim 14, wherein said base is 2-amino 2-methyl 1-propanol.

16. The glue stick of claim 1, further comprising a coloring component.

17. The glue stick of claim 16, wherein said coloring component is a pH sensitive color-former.

18. A method of providing repositionable adhesive on an individual sheet of paper comprising:
    a) applying the adhesive of claim 1 to a paper substrate, and
    b) applying said paper substrate to a receiving surface.

* * * * *